United States Patent [19]

Bernoudy, Jr.

[11] Patent Number: 5,325,808
[45] Date of Patent: Jul. 5, 1994

[54] FILLER AND PRESSURE INDICATOR VALVE

[76] Inventor: David A. Bernoudy, Jr., P.O. Box 1704, Boulder, Colo. 80306

[21] Appl. No.: 52,180

[22] Filed: Apr. 23, 1993

[51] Int. Cl.$^5$ .............................................. B60C 23/02
[52] U.S. Cl. .................................. 116/34 R; 116/272
[58] Field of Search ................ 73/146.2, 146.3, 146.8, 73/744; 116/34 R, 266, 272, 283; 137/227

[56] References Cited

U.S. PATENT DOCUMENTS

| | | | |
|---|---|---|---|
| 2,167,456 | 7/1939 | Hooper | 116/34 R |
| 2,842,087 | 7/1958 | Burns | 116/34 R |
| 3,111,930 | 11/1963 | Zipper | 116/34 R |
| 3,183,882 | 5/1965 | Preece | 116/34 R |
| 3,827,393 | 8/1974 | Winther | 116/34 R |
| 3,910,223 | 10/1975 | Krohn | 116/70 |
| 4,512,278 | 4/1985 | Winther | 116/34 R |
| 4,531,473 | 7/1985 | Winther | 116/34 R |
| 4,557,308 | 12/1985 | Kuypers | 116/34 R X |
| 4,594,960 | 6/1986 | Nalence | 116/34 R |
| 4,606,391 | 8/1986 | Achterholt | 116/34 R X |
| 4,726,223 | 2/1988 | Huang | 73/146.8 |

FOREIGN PATENT DOCUMENTS 0926592 4/1955 Fed. Rep. of Germany .... 116/34 R

Primary Examiner—William A. Cuchlinski, Jr.
Assistant Examiner—W. Morris Worth
Attorney, Agent, or Firm—Rogers, Howell & Haferkamp

[57] ABSTRACT

A filler and pressure indicator valve having a housing with a main valve openable upon depression by a conventional filler tool upon adding air to the tire and automatically closeable upon release of the tire filling tool. A shaft is slidable through the main valve, and on the inner end of the shaft there is a sensor valve. The sensor valve is normally closed but responds to a low pressure condition within the tire to open, moving the shaft inwardly and releasing a pop-up cap on the end of the shaft to trigger a visual sensor element. The device can be adjusted to settings for different desired air pressure levels below which the sensor valve will be actuated.

17 Claims, 2 Drawing Sheets

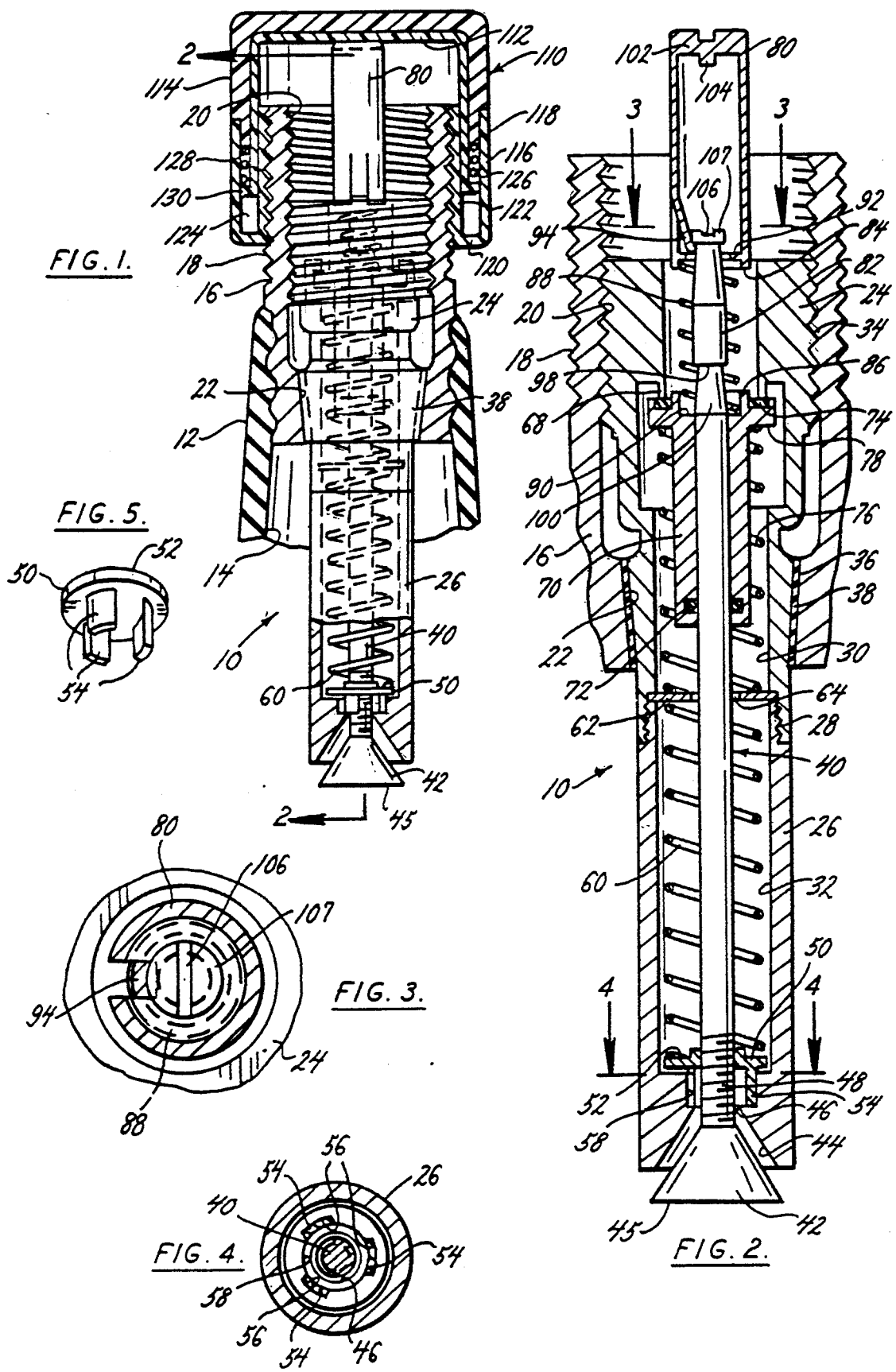

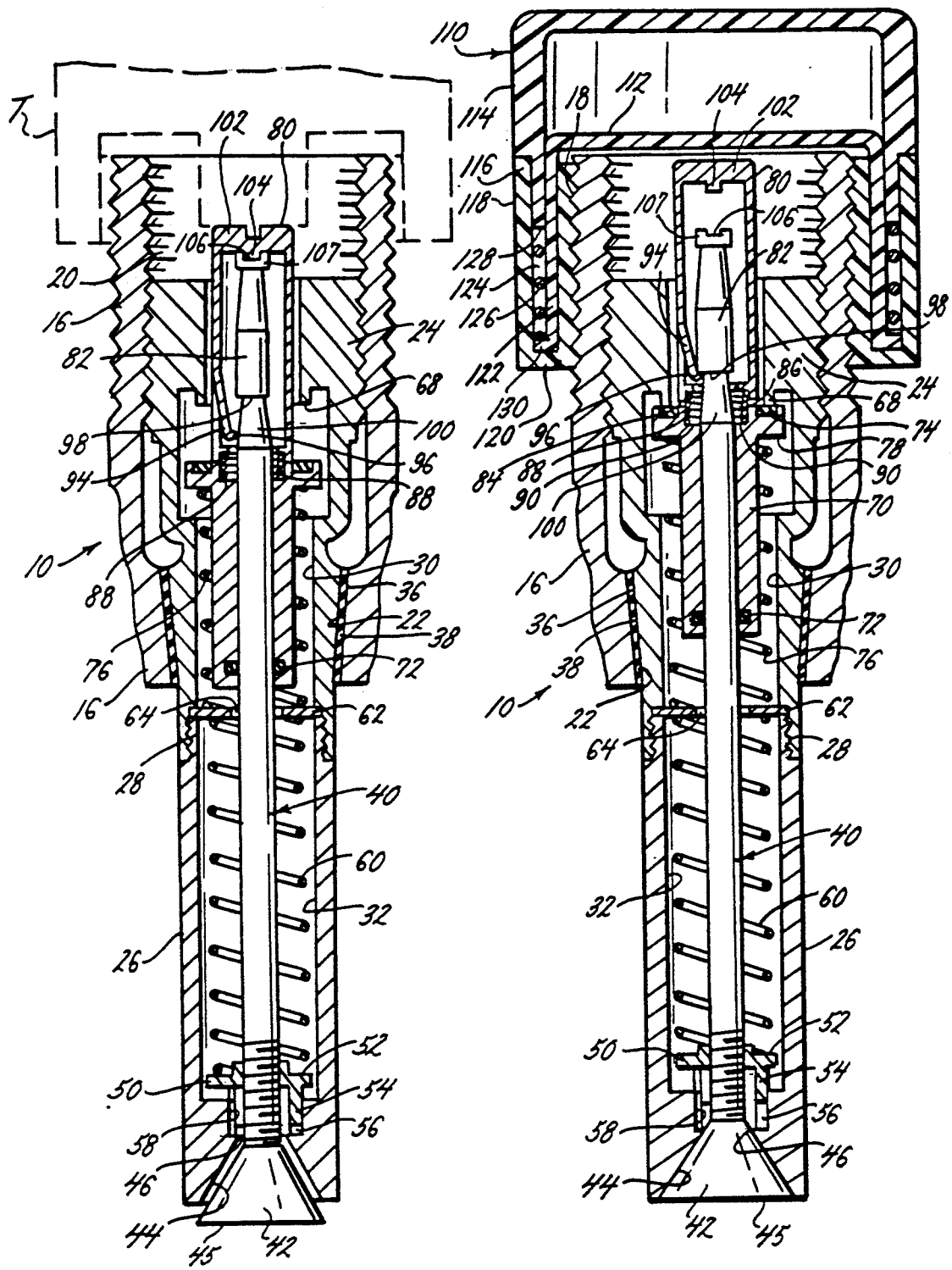

FILLER AND PRESSURE INDICATOR VALVE

BACKGROUND OF THE INVENTION (1) Field of the Invention

This invention relates to a filler valve that incorporates a low pressure indicator. More particularly, the invention relates to a tire valve with low pressure indicator that can be installed in a conventional tire filler stem and that incorporates a filler valve that is essentially like the standard filler valve known as a Schrader-type valve.

(2) Description of the Related Art

The filler valve that is in common use in the air filler stem of a tire is known as the Schrader-type valve, and it has been highly satisfactory and well accepted. However, the standard filler valve has no provisions for indicating a low pressure condition in the tire. The present invention provides a valve that functions in the same manner as the Schrader-type valve but incorporates with it a sensor valve that is triggered in response to a low pressure condition within a tire, coupled with an indicator that, when actuated by the sensor valve, provides a visual indication of a low pressure condition in the tire. Also, this filler and low pressure indicator valve is used in a standard valve sleeve and can replace a conventional Schrader-type valve either as original equipment on the tire or as a replacement or retro fit.

Those skilled in the art know that the maintenance of proper air pressure in a tire is important to avoid unduly rapid and uneven wear on the tire. In addition, braking and cornering performance of a vehicle are diminished by low tire pressure conditions and shock absorption qualities are less than optimal. Still further, low air pressure in the tires of a vehicle will increase fuel consumption and can contribute to undesirable exhaust emissions from the vehicle.

In tires equipped with conventional valves like the Schrader-type valve, checking and maintaining tire pressure is time consuming and inconvenient. The checking of tire pressure is no longer a routine performed at service stations either by the service personnel or by the vehicle operator. Typically, the air pressure in tires is checked far less frequently than appropriate and most vehicles are operated for extended periods on tires that have low pressure conditions.

The present invention alleviates these problems by providing a tire valve with a visible indicator that is actuated at any time by a low pressure condition in the tire in which the device is installed.

SUMMARY OF THE INVENTION

This invention provides a main valve and a sensor valve in a single housing. The main valve is much like the standard Schrader valve that is installed in a tire filler stem. In addition to the main valve, there is a sensor valve on the inner end of a shaft that is slidable through the main valve. At the outer end of the shaft, a pop-up cap, in its normal position, is latched to resist outward movement. However, a compression spring will move the pop-up cap outwardly upon release of the latch which occurs when the sensor valve moves the shaft in response to a low pressure condition in the tire. When the pop-up cap moves outwardly, it pushes an indicator cap, preferably red, into a position where it can be viewed readily through a semi-transparent outer cap by a person who merely glances at the tire.

The device has provisions for adjustment of the air pressure below which the sensor valve will be actuated to trigger the pop-up cap into an indicator position. The overall design allows this filler and pressure indicator valve to be installed In a standard tire filler stem, replacing a conventional valve as original equipment or as a retro fit device. This filler and pressure indicator valve can be retrofit in a conventional tire stem, replacing a conventional Schrader valve. Standard air filler chucks or filler tools will work as will standard air pressure gauges. The filler and pressure indicator valve of this invention meets current SAE standards.

BRIEF DESCRIPTION OF THE DRAWINGS

FIG. 1 is a side elevation view of the filler and pressure indicator valve with portions shown in section and shown installed in a tire or tube valve stem and showing the device in a low-pressure-indicating condition;

FIG. 2 is an enlarged view in section on the plane indicated by the line 2—2 of FIG. 1;

FIG. 3 is a view in section taken on plane indicated by the line 3—3 of FIG. 2 but with the cap assembly removed;

FIG. 4 is a view in section taken on plane indicated by the line 4—4 of FIG. 2;

FIG. 5 is a perspective view of the lower spring seat and shaft adjustment lug as viewed generally from below and to one side;

FIG. 6 is a section view of the filler and pressure indicator valve similar to that of FIG. 2 but illustrating the device in the normal full tire pressure condition; and FIG. 7 is a view in section similar to that of FIGS. 2 and 6 but showing the device in the tire filling condition with an air source tool shown in phantom.

DETAILED DESCRIPTION OF THE PREFERRED EMBODIMENT

The Filler Valve

This filler and pressure indicator valve 10 is adapted for installation in a conventional valve stem 12 of a tire or a tube. A conventional valve stem 12 provides a core channel 14 extending from within a tire or tube (not shown). A metal tip 16 is fixed to the outer portion of the core channel 14. The metal tip 16 has external threads 18 and internal threads 20, and further inward has a surrounding tapered or frustoconical wall 22. This conventional valve stem 12 with its conventional metal tip 16 is adapted to receive a conventional tire valve, such as the kind known as a Schrader valve, threaded into the internal threads 20 and seated in an airtight seal against the frustoconical wall 22. The tip 16 is adapted to receive a conventional cap threaded to the external threads 18. A feature of the present invention is that it provides a filler and pressure indicator valve that can be installed in the conventional valve stem 12.

This filler and pressure indicator valve has an outer body 24 and an inner body 26 joined together at an airtight threaded connection 28. An air passage 30 through the outer body 24 communicates with a passage 32 in the inner body 26. The outer body 24 has external threads 34 that complement the threads 20 and allow the outer body 24 to be threaded into the metal tip 18. A frustoconical wall 36 complementary to the wall 22 is faced with a resilient seating layer 38 that is compressed to establish an airtight seal when the outer body 24 is tightened into the metal tip 18 (in the manner that is conventional for a conventional tire or tube valve threaded into a stem).

The Sensor Valve

A shaft 40 extends through the air passages 30 and 32. The shaft 40 is formed with a frustoconical sensor valve member 42 at its inner end that is complementary to a frustoconical valve seat 44 on the inner end of the inner body 26. The valve member 42 has an inner face 45 that is exposed to air pressure in the tire or tube to which the stem 12 is connected. The valve seat 44 terminates at an opening 46 that communicates with the air passage 32. The shaft 40 has threads 48 adjacent its inner end where the shaft is threaded through a lower spring seat and shaft adjusting lug 50. This lug 50 has a flat outer face 52 and has spaced inwardly projecting prongs 54 (see FIG. 5) that can slide into a like number of slots 56 in the inner side wall portion 58 adjacent the lug 50. The fit of the prongs 54 in the slots 56 is loose enough to avoid impeding air flow and the transfer of air pressure.

A compression spring 60 bears against the outer face 52 of the lug 50 and against a washer 62 clamped between the upper and lower housings 24 and 26 when they are threaded together. A central opening 64 in the washer 62 is larger than the shaft 40 so that air can flow through the washer.

The passage 30 through the outer body 24 is formed to define a main valve seat 68. A valve member 70 of a conventional kind known as the standard Schrader-type is slidable on the shaft 40, with an 0-ring 72 providing an airtight seal between the valve member 70 and the shaft 40. The valve member 70 has a recess in which a sealing ring 74 is mounted. The sealing ring 74 provides an airtight seal when it is pressed against the valve seat 68 upon sliding of the valve member 70 outwardly. The valve member 70 is biased outwardly by a compression spring 76 that is installed between the washer 62 and a bearing wall 78 on the valve member 70. The spring rate of the spring 76 is higher than that of the spring 60.

The Pod-Up Cap

A pop-up cap 80 surrounds the upper portion 82 of the shaft 40. The pop-up cap 80 has an inner edge 84 that can bear against an opposing outer face 86 on the valve member 70. A compression spring 88 mounted between a wall 90 and a stop 92 on the cap 80 biases the cap 80 in an outward direction. The cap 80 has a finger 94 biased radially inwardly toward the shaft 40. A detent 96 on the end of the finger 94 is normally releasably retained against an annular stop wall 98 on the shaft 40. The side area 100 of the shaft 40 Just inward of the stop wall 98 is tapered to avoid interference with the detent 96 when the cap is pressed inwardly, as illustrated in FIG. 7.

The cap 80 has an outer wall 102 with an inwardly projecting square cornered rib 104. The rib 104 can fit in a straight slot or kerf 106 in an outer enlarged head 107 of the shaft 40 when the cap 80 is depressed into the position illustrated in FIG. 7. In this condition, because the rib 104 is temporarily retained within the kerf 106, rotation of the cap 80 will cause the shaft 40 to rotate within the lower spring seat and shaft adjusting lug 50. This changes the axial position of the lower spring seat and shaft adjusting lug 50 on the shaft 40.

The Protective and Indicator Cap Assembly

A protective and indicator cap assembly 110 is removably threaded on the metal tip 16 of the stem 12. The protective and indicator cap assembly 110 includes an inner cap 112 that preferably is opaque red plastic. The inner cap 112 is slidable within an outer cap 114 that is of semi-transparent plastic. The outer semi-transparent plastic cap 114 is glued to the outer wall 116 of a cap sleeve 118. The outer wall 116 of the cap sleeve 118 is joined by a base 120 to an internally threaded inner wall 22 of the cap sleeve that allows the protective and indicator cap assembly 110 to be removably threaded onto the metal tip 16 in the way a conventional protective cap is threaded onto a tire or tube stem. The cap sleeve 118 is opaque plastic. The space between the outer and inner walls 116 and 122 of the sleeve 118 defines a cavity 124 within which the inner cap 112 can slide. There is a light compression spring 126, weaker than the compression spring 88, that bears between a stop 128 on the outer cap 114 and a stop 130 on the inner cap 112 to bias the inner cap 112 inwardly to the position illustrated in FIG. 6 where it is not visible through the semi-transparent outer cap 114.

OPERATION

FIG. 6 illustrates the normal condition of this filler and pressure indicator valve 10, when the tire pressure is normal and when the tire is not being filled. In this condition, the sealing ring 74 of the main valve member 70 is seated against the valve seat 68 blocking air flow, and the sensor valve member 42 is seated against the valve seat 44 blocking the escape of air from the tire. The spring 60 is held under compression and exerts an inward force against the lower spring seat and shaft adjusting lug 50 that is insufficient to overcome the force created by air pressure against the inner face 45 of the valve member 42. The compression spring 76 holds the main valve member 70 in sealing engagement with the valve seat 68. The pop-up cap 80 is in its latched position with the detent 96 of its finger 94 latched against the stop wall 98, holding the spring 88 in compression. The inner cap 112 of the protective and indicator cap assembly 110 is depressed by the biasing force of the spring 126 and is not visible through the semitransparent outer cap 114.

Low Pressure Condition

When the pressure in the tire drops below a predetermined level, the filler and pressure indicator valve 10 is tripped to the condition illustrated in FIGS. 1 and 2. Because of the reduced pressure within the tire, the force against the face 45 of the valve member 42 will have been reduced to less than that sufficient to overcome the force of the compression spring 60, and the compression spring 60 bearing against the lower spring seat and shaft adjusting lug 50 will drive the shaft 40 inwardly. As the shaft 40 moves inwardly, the valve member 70 remains seated against the valve seat 68 under the force of the compression spring 76 because the force of the spring 76 is greater than the force of the smaller compression spring 88. Therefore, as the shaft 40 moves inwardly, the inner cap edge 84 of the cap 80 remains in contact with the outer face 86 of the valve member 70, preventing the pop-up cap 80 from moving inwardly with the shaft 40. The consequent inward movement of the shaft 40 while the pop-up cap 80 is blocked from moving inwardly with the shaft causes the detent 96 to snap free of the stop wall 98. Once the detent 96 is free of the stop wall 98, the compression spring 88 can force the pop-up cap 80 outwardly from the position illustrated in FIG. 6 to the position illustrated in FIG. 2 where the detent 96 engages the enlarged head 107 on the outer end of the shaft 40.

As the pop-up cap 80 is thus forced outwardly the pop-up cap 80 pushes the inner red indicator cap 112 outwardly from the position illustrated in FIG. 6 to the position illustrated in FIG. 1, because the strength of the compression spring 88 is greater than the strength of the compression spring 126. In this outer position, the red indicator cap 112 can be seen through the semi-transparent outer cap 114 and an operator who glances at the tire will know that the pressure in the tire is below a predetermined level.

Filling Condition

To add air to the tire, the cap assembly 110 is removed, and a conventional air filler tool T of the kind connected to a source of compressed air (not shown) is pressed onto the metal tip 16 as illustrated in FIG. 7. Because the pop-up cap 80 is located at the same place as the valve stem on a conventional tire filler valve, such as a standard Schrader-type valve, and because the diameter of the pop-up cap 80 is within industry standard, application of the conventional air filler tool T depresses the pop-up cap 80 inward from the normal position shown in FIG. 6 to the depressed position shown in FIG. 7. As the cap-moves from the position illustrated in FIG. 6 (or the position shown in FIG. 2) under pressure of the tool T, the engagement of the inner cap edge 84 with the outer valve member face 86 forces the valve member 70 inwardly, initially separating the sealing ring 74 from the valve seat 68 to break the airtight seal normally maintained by the main valve 70. Further inward movement of the pop-up cap 80 continues to move the main valve 70 inwardly, but until the outer wall 102 of the pop-up cap 80 contacts the head 107 of the shaft 40, the shaft 40 is not affected. However, upon contact by the outer wall 102 with the shaft head 107 and further depression of the pop-up cap 80 by movement of the tool T toward the position illustrated in FIG. 7, the shaft 40 is pressed inwardly from the position illustrated in FIG. 6 to the position illustrated in FIG. 7. This inward movement of the shaft 40 separates the valve member 42 from the valve seat 44 and allows air to flow from the passage 32 past the valve member 42 and into the tire. Now air from the compressed air source can flow through the passage 30, bypassing the pop-up cap 80 and flowing past the valve seat 68, and can flow through the passage 30, through the hole 64 in the washer 62, through the passage 32, past the loosely fitting lower spring seat and shaft adjusting lug 50, and past the valve member 42 into the tire.

When the tire is filled to the desired pressure, the tool T is removed. Immediately, the pressure within the tire against the valve member 42 closes the valve member 42 against the valve seat 44 by raising the shaft 40. The main valve 70 will not yet have closed because the distance it must travel to close is greater than the distance the valve member 42 will have travelled to close. The still open condition of the valve 70 allows the pressure on both sides of the main valve member 70 to equalize to atmospheric pressure, allowing the force of air pressure against the face 45 to seat the sensor valve member 42 firmly against the sensor seat 44. Subsequently, the valve member 70 will close against the valve sea 68 under the force of the compression spring 76. Meanwhile, because the pop-up cap 80 was moved by the tool T to the position illustrated in FIG. 7 during the introduction of air to the tire, the arm 94 and its detent 96 will have been pressed inwardly of the stop face 98. Release of the tool T allows the compression spring 88 to push the pop-up cap 80 outwardly until the detent 96 comes into contact with the stop face 98 and assumes the position illustrated in FIG. 6. Now when the protective and indicator cap assembly 110 is replaced, the compression spring 126 having biased the inner cap 112 inwardly to the position illustrated in FIG. 6, the inner cap 112 is again not readily visible through the semi-opaque outer cap 114 and the entire filler and pressure indicator valve is reset to its normal condition as illustrated in FIG. 6. This resetting occurs automatically when the tool T releases the pop up cap 80 and the sensor valve member 42 contacts the valve seat 44. Hence, no special action by the user is required for resetting.

Low Pressure Adjustment

Recommended, or desired, tire pressures vary. Therefore, the level below which the pressure in the tire would be considered low, varies. On this filler and pressure indicator valve 10, it is possible to adjust the level below which the low pressure indicator 112 will be triggered. This adjustment is achieved by manually depressing the pop-up cap 80 until the rib 104 has entered the slot 106. Then, rotation of the pop-up cap 80 will rotate the shaft 40, threading the shaft 40 inwardly or outwardly relative to the lower spring seat and shaft adjusting lug 50. (The lug 50 is prevented from rotating by the loose, sliding interlock between the prongs 54 and the slot 56.) Consequently, the effective distance between the lug outer face 52 and the washer 62 will be increased or decreased, thereby correspondingly increasing or decreasing the force of the spring 60 as it is elongated or compressed. Changing the effective force of the spring 60 changes the level of air pressure against the valve face 45 below which the spring 60 will open the sensor valve. The pop-up cap 80 and outer body 24 may be provided with appropriate markings (not shown) corresponding to different pressure setting within the normal tire pressure ranges. Thus, the filler and pressure indicator valve can be readily and accurately calibrated to a desired actuation pressure.

An important characteristic of this filler and pressure indicator valve 10 is that it can be installed in place of the Schrader-type valve. Certain dimensions make this interchangeably possible. The following dimensions apply when the filler and pressure indicator valve 10 is in the normal condition illustrated in FIG. 6: The projection of the pop-up cap 80 above the outer body 24 is about 0.113 inch. The span from the outer wall 102 of the pop-up cap 80 to the top (largest diameter) of the frusto-conical wall 36 is about 0.351 inch. The length of the frusto-conical wall 36 is about 0.123 inch. The overall length from the outer wall 102 to the inner end of the inner body 26 (or the face 45) is about 0.880 inch. The maximum diameter of the outer body 24 is about 0.205 inch. The diameter of the inner body 26 is about 0.138 inch. The diameter of the face 45 of the sensor valve member 42 is about 0.118 inch.

While the present invention has been described by reference to a specific embodiment, it should be understood that modifications and variations of the invention may be constructed without departing from the scope of the invention defined in the following claims.

What is claimed is:

1. A filler and pressure indicator valve comprising:

a valve body adapted to be installed in a tire or tube filler stem, a passage through the body between an upstream end where air can be introduced for filling the tire and a downstream end where air flows from the stem to the tire, a main valve means for normally blocking the flow of air through the passage and being operable to unblock the flow of air through the passage in response to actuation by an air filler tool engaging the upstream end, a sensor valve including a sensor valve seat in the passage and a sensor valve member movable into and away from sealing engagement with the valve seat, means for maintaining the sensor valve member in sealing engagement with the sensor valve seat in response to maintenance of air pressure above a predetermined level at the downstream end, means for moving the sensor valve member away from sealing engagement with the sensor valve seat in response to reduction of air pressure to a level below said predetermined level, means for moving the sensor valve member away from sealing engagement with the sensor valve seat in response to said actuation by an air filler tool engaging the upstream end, a cap assembly mountable over the upstream end and including an indicator movable into and away from a position at which it is visible, and means responsive to movement of the sensor valve member away from sealing engagement with the sensor valve seat for moving the indicator into said visible position.

2. The filler and pressure indicator valve of claim 1 wherein:

the means for moving the indicator comprises a shaft extending through the passage from the sensor valve member to a point adjacent the upstream end, means cooperative between the shaft and the indicator for normally releasably retaining the indicator in said non visible position, means for biasing the indicator toward said visible position, and means for releasing the retainer to enable the indicator to be moved by the biasing means to the visible position.

3. The filler and pressure indicator valve of claim 2 wherein:

the main valve means is located upstream of the sensor valve and comprises a main valve seat in the passage and a main valve member movable into and away from sealing engagement with the main valve seat, a bore through the main valve member, the shaft extending slidably through the bore in the main valve member, and means for maintaining an air-tight seal between the main valve member and the shaft.

4. The filler and pressure indicator valve of claim 3 wherein:

the main valve member is located downstream of the main valve seat, the main valve seat and the main valve comprise mutually opposed rings for establishing an air-tight seal when the rings are in engagement, one of the rings defining a knife edge and the other rings comprising a resilient material in the path of the knife edge.

5. The filler and pressure indicator valve of claim 4 wherein the knife edge ring is on the main valve seat and the resilient material ring is on the main valve member.

6. The filler and pressure indicator valve of claim 1 wherein:

the main valve means includes a main valve seat in the passage and a main valve member slidable toward and away from the main valve seat, a stop in the passage downstream of the main valve member, and a main valve compression spring seated between the stop and the main valve member for biasing the main valve member toward a position for seating against the main valve seat.

7. The filler and pressure indicator valve of claim 6 wherein:

the means for moving the indicator into said visible condition includes an actuator member, a shaft extending through the passage and slidable through the main valve member, the shaft having an inner end to which the sensor valve member is connected and an outer end adjacent the upstream end of the passage, means for releasably latching the actuator member to the outer end of the shaft, means for biasing the actuator member outwardly relative to the shaft and toward the indicator, and means responsive to movement of the sensor valve member away from the sensor valve seat for releasing the actuator member latching means whereby the actuator member is moved outwardly by the actuator member biasing means to move the indicator into said visible position.

8. The filler and pressure indicator valve of claim 7 wherein:

the actuator member biasing means comprises a compression spring seated between the main valve member and the actuator member, the actuator member compression spring being weaker than the main valve compression spring.

9. The filler and pressure indicator valve of claim 6 including:

means cooperative between the actuator member and the shaft for adjustment of the predetermined pressure level upon rotation of the actuator member.

10. The filler and pressure indicator valve of claim 9 wherein:

the adjustment means includes a lug through which the shaft is threaded, means for preventing rotation of the lug when the shaft is threaded, the means for moving the sensor valve member in response to reduction of air pressure comprising a sensor valve compression spring having one end fixed relative to the sensor valve member and the other end seated against the lug whereby rotation of the shaft relative to the lug changes the effective length and thereby the biasing force of the sensor valve compression spring.

11. The filler and pressure indicator valve of claim 8 wherein:

the actuator member comprises a cap over the outer end of the shaft, the means for releasably latching the actuator member comprises a stop face of the shaft and a detent on the cap biased into releasable engagement with the stop face and releasable upon movement of the shaft inward relative to the actuator member, and an inner edge on the cap engageable with an outer wall on the main valve member for preventing inward movement of the cap when the shaft moves inwardly in response to movement of the sensor valve member away from the sensor valve seat.

12. The filler and pressure indicator valve of claim 1 wherein:

the sensor valve member and sensor valve seat define opposed frusto-conical surfaces.

13. The filler and pressure indicator valve of claim 1 wherein:

the sensor valve member and sensor valve seat are downstream relative to the main valve member and main valve seat, the main valve seat comprising an annular projection extending downstream, the main valve member supporting a resilient ring for seating against the annular projection.

14. The filler and pressure indicator valve of claim 1 including:

means responsive to actuation of the air filler tool engaging the upstream end for operating the main valve means to unblock the flow of air and thereafter for moving the sensor valve member away from sealing engagement with the sensor valve seat, and responsive to disengagement of the air filler tool from the upstream end for moving the sensor valve member into seating engagement with the sensor valve seat and thereafter for enabling the main valve means to block the flow of air through the passage.

15. The filler and pressure indicator valve of claim 14 wherein:

means for operating the main valve means includes a shaft having an upstream end adjacent the upstream end of the passage and a downstream end adjacent the downstream end of the passage and joined to the sensor valve member, and actuator means responsive to engagement by an air filler tool and moveable relative to the shaft for operating the main valve to unblock the flow of air, and for engaging the shaft to move the sensor valve member.

16. A filler and pressure indicator valve comprising:

a housing having an outer end and an inner end adapted for threading into the stem of a tire or tube with the inner end inward of the tire and the outer end outward of the tire, an interior wall in the housing defining an air flow passage through the housing, a main valve seat in the passage between the outer and inner ends, a main valve member slidable between seated and unseated positions relative to the valve seat for alternatively blocking and unblocking the flow of air through the passage, a means for biasing the main valve member toward the seated position, a shaft means extending through the main valve member and having an outer end accessible for depression contact by an air filler tip and having an inner end at the inner end of the housing, means for maintaining an air-tight seal between the main valve member and the shaft means while allowing relative sliding movement therebetween, a sensor valve seat formed in the housing, a sensor valve member supported by the shaft means at the inner end thereof and moveable upon sliding movement of the shaft means between seated and unseated positions relative to the sensor valve seat, sensor spring means for biasing the sensor valve member toward its unseated position, the sensor valve member having a valve face oriented downstream and exposed to air pressure within the tire or tube for biasing the sensor valve member toward its seated position and for yielding to allow the sensor valve member to move to its unseated position when the force applied by the sensor spring means exceeds the force resulting from tire or tube pressure against the face of the sensor valve member, and means responsive to movement of the sensor valve member to its unseated position for indicating a low pressure condition in the tire or tube.

17. The filler and pressure indicator valve of claim 12 wherein:

the housing has an outer surface, a tapered section on the outer surface for seating against a tapered seat within the tire or tube stem, and external threads on the outer surface of the housing for establishing threaded engagement with internal threads on the stem and thereby for pressing the tapered section against the tapered seat.

* * * * *